United States Patent [19]

Fischer

[11] Patent Number: 4,986,711
[45] Date of Patent: Jan. 22, 1991

[54] ANCHORING PLUG

[75] Inventor: Artur Fischer, Waldachtal/Tumlingen, Fed. Rep. of Germany

[73] Assignee: fischerwerke Artur Fischer GmbH & Co. KG, Tumlingen/Waldachtal, Fed. Rep. of Germany

[21] Appl. No.: 233,276

[22] Filed: Aug. 17, 1988

[30] Foreign Application Priority Data

Sep. 9, 1987 [DE] Fed. Rep. of Germany ....... 3730211

[51] Int. Cl.$^5$ ............................................. F16B 13/06
[52] U.S. Cl. ......................................... 411/55; 411/60
[58] Field of Search ....................... 411/32, 33, 44, 55, 411/57, 60, 69, 70, 71, 72

[56] References Cited

U.S. PATENT DOCUMENTS

| 1,850,768 | 3/1932 | Peirce | 411/55 |
| 2,052,793 | 9/1936 | Peirce | 411/57 |
| 2,878,709 | 3/1959 | Horvath | 411/57 |
| 4,516,378 | 5/1985 | Fischer | 411/55 X |
| 4,640,654 | 2/1987 | Fischer et al. | 411/55 |
| 4,656,806 | 4/1987 | Leibhard et al. | 411/55 X |

FOREIGN PATENT DOCUMENTS

| 2237965 | 2/1974 | Fed. Rep. of Germany | 411/33 |
| 2071249 | 9/1981 | United Kingdom | 411/57 |

Primary Examiner—Gary L. Smith
Assistant Examiner—Jerry Redman
Attorney, Agent, or Firm—Michael J. Striker

[57] ABSTRACT

An anchoring plug comprises a plug shaft having a leading end and a trailing end as considered in direction of driving into a supporting structure, a mounting member provided on the trailing end of the plug shaft for mounting an object, an expansible sleeve, and a expander cone which is to be pulled into the expansible sleeve, the expander cone being provided with an abutment, and a sliding sleeve which is located before the expander cone as considered in the driving direction and abutting against the abutment so that the sliding sleeve is deformable by the expansible sleeve, and the expansible sleeve is displaceable onto the expander cone over the sliding sleeve.

7 Claims, 1 Drawing Sheet

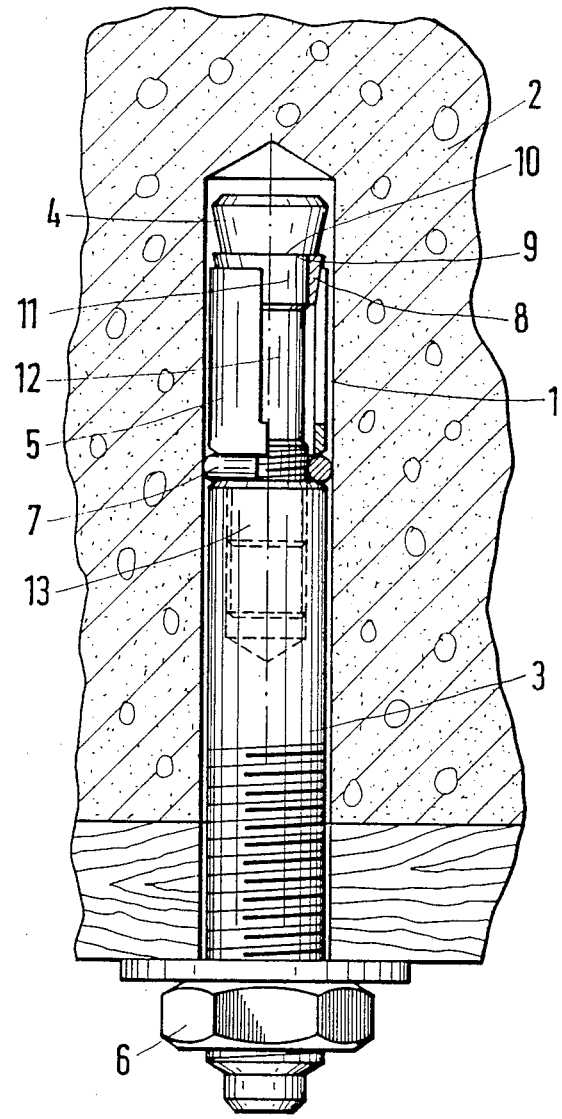

ANCHORING PLUG

BACKGROUND OF THE INVENTION

The present invention relates to anchoring plugs. More particularly, it relates to an anchoring plug which has an expander cone mounted on one end of a plug shaft for supporting an object, and an expansible sleeve which is expanded by the expander cone.

Anchoring plugs of the above mentioned general type are known in the art. One of such anchoring plugs is disclosed U.S. Pat. No. 4,640,654. In the anchoring plug disclosed in this document the pulling of the expander cone into the expansible sleeve is performed so that a screw which is arranged at the opposite end of the plug shaft abuts against an object to be mounted. During rotation of the screw the shaft and thereby the expander cone are pulled outwardly of the hole in which the anchoring plug is inserted. The expansible sleeve remains fixed stationarily in the hole and is expanded by the expander cone so that the expansible sleeve is pressed against the wall of the hole.

Such anchoring plugs are used for example in concrete masonry. When subsequent expansions of the holes occur, for example because of formation of cracks, there is the requirement that the anchoring plug is expanded to continue the reliable performance of its holding function. The post-expanding condition is however unfavorably affected in the anchoring plug which is anchored in a hole during pressing-on between the expander cone and the expansible sleeve. Under the action of high expanding forces the expansible sleeve can jam on the expander cone.

SUMMARY OF THE INVENTION

Accordingly, it is an object of the present invention to provide an anchoring plug which avoids the disadvantages of the prior art.

More particularly, it is an object of the present invention to provide an anchoring plug in which a good sliding property between the metallic expander cone and the metallic expansible sleeve is maintained.

In keeping with these objects and with others which will become apparent hereinafter, one feature of the present invention resides, briefly stated, in an anchoring plug with an abutment formed on an expander cone, and with a low-friction sliding sleeve located before an expander cone, wherein the sliding sleeve abuts against the abutment and is deformed by an expansible sleeve, so that the expansible sleeve is displaceable over the sliding sleeve onto the expander cone.

The sliding sleeve is composed of a material which is deformable during the expanding process so that a part of the material of the sliding sleeve is taken along by the expansible sleeve and squashed along the conical surface. The pores of the conical surface are thereby clogged with the material of the sliding sleeve, and similarly the pores of the inner surface of the expansible sleeve which slides over the expander cone are clogged as well. As a result of this, the sliding property between the expander cone and the expansible sleeve is significantly increased and thereby the post-expanding ability is considerably improved.

In accordance with a preferable embodiment of the invention, the sliding sleeve extends outwardly beyond the outer surface of the expander cone in the region of the abutment. The outwardly projecting material is distributed along the conical surface of the expander cone during the expansion process because of high pressure between the expansible sleeve and the sliding sleeve. Depending the material of the sliding sleeve and the size of the sliding sleeve, a more or less thin sliding film between the expander cone and the expansible sleeve is produced. Especially advantageous results are obtained with a sliding sleeve which is composed of polyamide, which has a conical peripherial surface corresponding to the inclination of the expander cone.

The abutment can be formed by a ring surface of a step which limits the expander cone. The sliding sleeve has an end which faces away of the plug shaft and abuts against the ring surface of the step.

The expansible sleeve has a conical inner surface which can correspond to the inclination of the expander cone. Also, the conical inner surface of the expansible sleeve contributes to the desired effect that a part of the material of the sliding sleeve is distributed uniformly and paper-thinly over the expander cone during the expansion process.

Instead of a sliding sleeve which is composed of synthetic plastic material, also a sliding sleeve of a soft metal of for example lead can be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing an anchoring plug in accordance with the present invention in a drilled hole of a supporting structure for supporting an object.

DESCRIPTION OF A PREFERRED EMBODIMENT

A metallic anchoring plug in accordance with the present invention is shown in the drawing as inserted in a drilled hole 1 of a masonry 2. The anchoring plug includes a shaft 3, an expander cone 4 connected with the shaft 3 by another shaft 12, an expansible sleeve 5, and a mounting nut 6. A safety element is located between the expansible sleeve 5 and the shaft 3 and formed as a spring ring 7. The spring ring 7 fixes the expansible sleeve 5 before spreading in the hole 1.

A low-friction sliding sleeve 8 is arranged between the expander cone 4 and the expansible sleeve 5. It is supported on a ring surface 9 of the step 10 which limits the expander cone 4. The ring surface 9 serves therefore as an abutment for the sliding sleeve 8. The sliding sleeve 8 has an inner diameter which corresponds to the diameter of the portion 11 of the shaft 12 which extends through the expansible sleeve.

The expansible member with its expander cone 4 is rigidly connected to the shaft 12 and a threaded portion 13 with the shaft 3 of the plug. When the mounting, nut 6 is tightened, the plug shaft 3 together with the expander cone 4 is moved in direction toward the opening of the hole. Since the expansible sleeve 5 is fixed by the safety element 7 stationarily in the hole, the sliding sleeve 8 and the expander cone 4 move into the expansible sleeve 5 and further into it, until the expansible sleeve 5 abuts with a desired pressure against the wall of the hole.

During the spreading process, a part of the material of the sliding sleeve 8 which projects in the region of the step 10 is distributed under high pressure by the expansible sleeve 5 over the conical surface of the expander cone 4. Thereby, at least the pores of the conical surface are clogged, so that the slidability between the expansible sleeve 5 and the expander cone 4 is significantly increased. As a result of this, not only a lower torque on the mounting screw 6 must be used during the spreading, but also the post-spreading condition in the subsequently expanding hole 1 is significantly improved. The safety element 7 must have low holding forces for preventing a sliding out of the expansible sleeve 5 from the hole 11.

In the shown example the sliding sleeve 8 is composed of polyamide, while the remaining parts of the anchoring plug are composed of metal.

The sliding sleeve 8 projects laterally beyond the outer surface of the expander cone in the region of the abutment 9. The sliding sleeve 8 has a conical peripheral surface and the inclination of this conical surface substantially corresponds to the inclination of the expander cone. The inclination of the inner surface of the expansible sleeve also corresponds to the inclination of the expander cone. The sliding sleeve 8 is composed of a material which is deformable and has high sliding properties, for example of a synthetic plastic material such as polyamide or of a soft metal such as lead.

It will be understood that each of the elements described above, or two or more together, may also find a useful application in other types of constructions differing from the types described above.

While the invention has been illustrated and described as embodied in a mounting plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An anchoring plug, comprising, a plug shaft having a leading end and a trailing end as considered in direction of driving into a supporting structure; mounting means provided on said trailing end of said plug shaft for mounting an object; a metallic expansible sleeve having an inner surface; and a metallic expander cone which is to be pulled into said expansible sleeve and has an outer conical surface, said expander cone being provided with an abutment; and a sliding sleeve which is located between said expander cone and said expansible sleeve and abutting against said abutment so that said expander cone is displaceable into said expansible sleeve with interposition of said sliding sleeve which is taken along, said sliding sleeve is composed of such material that said material is deformed and clogs pores of said surfaces of said expander cone and said expansible sleeve and also has sliding property to improve slidability between said expander cone and said expansible sleeve, said material of said sliding sleeve being a material selected from the group consisting of polyamide and lead.

2. An anchoring plug as defined in claim 1, wherein said abutment of said expander cone extends in direction toward said plug shaft.

3. An anchoring plug as defined in claim 1, wherein, said sliding sleeve in the region of said abutment projects outwardly beyond said outer surface of said expander cone.

4. An anchoring plug as defined in claim 1, wherein said outer surface of said sliding sleeve is conical.

5. An anchoring plug as defined in claim 4, wherein said surfaces of said expander cone and said sliding sleeve have substantially equal inclinations.

6. An anchoring plug as defined in claim 1, wherein said abutment is formed as a ring surface of a step which limits said expander cone at its trailing end as considered in the driving direction.

7. An anchoring plug as defined in claim 1, wherein said material of said sliding sleeve is a synthetic plastic material.

* * * * *